(12) United States Patent
Kim et al.

(10) Patent No.: US 9,014,854 B2
(45) Date of Patent: Apr. 21, 2015

(54) ROBOT AND CONTROL METHOD THEREOF

(75) Inventors: Myung Hee Kim, Suwon-si (KR);
Kyung Shik Roh, Seongnam-si (KR);
Young Bo Shim, Seoul (KR); San Lim,
Suwon-si (KR)

(73) Assignee: Samsung Electronics Co., Ltd.,
Gyeonggi-do (KR)

( * ) Notice: Subject to any disclaimer, the term of this patent is extended or adjusted under 35 U.S.C. 154(b) by 744 days.

(21) Appl. No.: 13/232,383

(22) Filed: Sep. 14, 2011

(65) Prior Publication Data

US 2012/0078419 A1    Mar. 29, 2012

(30) Foreign Application Priority Data

Sep. 27, 2010   (KR) .................. 10-2010-0093063

(51) Int. Cl.
*G05B 19/04*   (2006.01)
*B25J 9/16*    (2006.01)

(52) U.S. Cl.
CPC ...................... *B25J 9/1669* (2013.01)

(58) Field of Classification Search
CPC ........ B25J 9/1612; B25J 9/0084; B25J 13/02; B25J 13/08; B25J 15/103; B25J 9/1664–9/1669
USPC ........... 700/245, 253, 258, 262, 255; 382/153
See application file for complete search history.

(56) References Cited

U.S. PATENT DOCUMENTS

| 5,513,299 | A  | * | 4/1996  | Terasaki et al. | 700/255 |
| 7,706,918 | B2 | * | 4/2010  | Sato et al.     | 700/245 |
| 8,244,402 | B2 | * | 8/2012  | Wells et al.    | 700/250 |
| 8,355,816 | B2 | * | 1/2013  | Saito           | 700/253 |
| 8,504,191 | B2 | * | 8/2013  | Furukawa        | 700/218 |
| 2007/0293986 | A1 | * | 12/2007 | Nagatsuka et al.| 700/245 |
| 2008/0240889 | A1 | * | 10/2008 | Yokoyama        | 414/1   |

* cited by examiner

*Primary Examiner* — Thomas G Black
*Assistant Examiner* — Luke Huynh
(74) *Attorney, Agent, or Firm* — Harness, Dickey & Pierce, P.L.C.

(57) ABSTRACT

A robot and a control method thereof. The robot has plural robot arms, each having at least one joint unit and a hand, and the control method includes dividing an object into target and feasible grasp regions and storing grasp policies respectively corresponding to the grasp regions, sensing respective orientations of the object, the at least one joint unit, and an obstacle, judging whether or not grasping of the target grasp region is feasible after sensing the orientations, generating a grasp route using the grasp policy for the target grasp region, upon judging that grasping of the target grasp region is feasible, and generating a grasp route using the grasp policy for one of the feasible grasp regions, upon judging that grasping of the target grasp region is not feasible, and controlling the at least one joint unit and the hand to trace the generated grasp route.

12 Claims, 12 Drawing Sheets

ROBOT AND CONTROL METHOD THEREOF

CROSS-REFERENCE TO RELATED APPLICATIONS

This application claims the benefit of Korean Patent Application No. 2010-0093063, filed on Sep. 27, 2010 in the Korean Intellectual Property Office, the disclosure of which is incorporated herein by reference.

BACKGROUND

1. Field

Embodiments relate to a robot, which naturally and stably grasps an object, and a control method thereof.

2. Description of the Related Art

In general, machinery which performs motions similar to those of a human using an electric or magnetic action is referred to as a robot. Robots at the early stage were industrial robots, such as manipulators or transfer robots, which performed dangerous work, simple repeated work, and work requiring great strength in place of humans for the purpose of work automation or unmanned work on industrial lines. Recently, research and development of humanoid robots which have an external appearance similar to that of humans and coexist in working and living spaces of humans to provide various services is progressing.

Such a humanoid robot is provided with robot hands to grasp an object so as to achieve interchange and cooperation with humans in daily life, and the robot hand includes a plurality of fingers and a palm similar to a human hand. The robot hand adjusts stiffness of tips of the fingers through impedance control, thus achieving both precise work and flexible and stable work.

In a conventional robot grasp control method, since a designated region of an object is set as a grasp region, if any obstacle is present in the grasp region, grasping of the object fails, and in order to grasp the object, a user sets a part of the object to be grasped, thus causing user inconvenience.

SUMMARY

Therefore, it is an aspect of one or more embodiments to provide a robot and a control method thereof in which an object is divided into regions, grasp policies corresponding to the respective regions are stored, and grasping of a proper region is performed according to orientations of the object, joint units, and an obstacle so as to allow the robot to perform stable grasp.

Additional aspects of embodiments will be set forth in part in the description which follows and, in part, will be obvious from the description, or may be learned by practice of the embodiments.

In accordance with an aspect of one or more embodiments, a control method of a robot with a plurality of robot arms, each of which has at least one joint unit and a hand, includes dividing an object into a target grasp region and feasible grasp regions and storing grasp policies respectively corresponding to the target grasp region and the feasible grasp regions, sensing respective orientations of the object, the at least one joint unit, and an obstacle, judging whether or not grasping of the target grasp region is feasible in consideration of the orientations of the obstacle and the object and a movable angle range of the at least one joint unit, after sensing the respective orientations of the object, the at least one joint unit, and the obstacle, generating a grasp route using the grasp policy for the target grasp region, upon judging that grasping of the target grasp region is feasible, and generating a grasp route using the grasp policy for one of the feasible grasp regions, upon judging that grasping of the target grasp region is not feasible, and controlling the at least one joint unit and the hand of each robot arm so as to trace the generated grasp route.

The sense of the respective orientations of the object, the at least one joint unit, and the obstacle, the judgment as to whether or not grasping of the target grasp region is feasible according to the orientations, the generation of the grasp route, and control of the at least one joint unit and the hand so as to trace the generated grasp route may be repeated until grasping of the target grasp region is performed.

The grasp policies may include data regarding a robot hand grasping the object and relative orientations of the robot hand grasping the object and the object.

In the judgment as to whether or not grasping of the target grasp region is feasible, it may be judged that grasping of the target grasp region is not feasible, if the obstacle is located in the target grasp region, the target grasp region is located at a position exceeding the movable angle range of the at least one joint unit, or grasping of the target grasp region causes the robot to lose balance.

In accordance with another aspect of one or more embodiments, a robot with right and left arms, each of which has at least one joint unit and a hand, includes a memory unit to divide an object into a target grasp region and feasible grasp regions and to store grasp policies respectively corresponding to the target grasp region and the feasible grasp regions, a sensing unit to sense respective orientations of the object, the at least one joint unit, and an obstacle, and a grasp control unit to judge whether or not grasping of the target grasp region is feasible in consideration of the orientations of the obstacle and the object and a movable angle range of the at least one joint unit, when the respective orientations of the object, the at least one joint unit, and the obstacle are sensed, to generate a grasp route using the grasp policy for the target grasp region stored in the memory unit, upon judging that grasping of the target grasp region is feasible, and to generate a grasp route using the grasp policy for one of the feasible grasp regions stored in the memory unit, upon judging that grasping of the target grasp region is not feasible.

The grasp control unit may repeat the sensing of the respective orientations of the object, the at least one joint unit, and the obstacle, the judgment as to whether or not grasping of the target grasp region is feasible according to the orientations, and the generation of the grasp route until grasping of the target grasp region is performed.

The grasp control unit may control the at least one joint unit and the hand of each robot arm so as to trace the generated grasp route.

The memory unit may store the grasp policies including data regarding a robot hand grasping the object and relative orientations of the robot hand grasping the object and the object.

The grasp control unit may judge that grasping of the target grasp region is not feasible if the obstacle is located in the target grasp region, the target grasp region is located at a position exceeding the movable angle range of the at least one joint unit, or grasping of the target grasp region causes the robot to lose balance.

BRIEF DESCRIPTION OF THE DRAWINGS

These and/or other aspects of embodiments will become apparent and more readily appreciated from the following description of the embodiments, taken in conjunction with the accompanying drawings of which.

DETAILED DESCRIPTION

Figure 1:
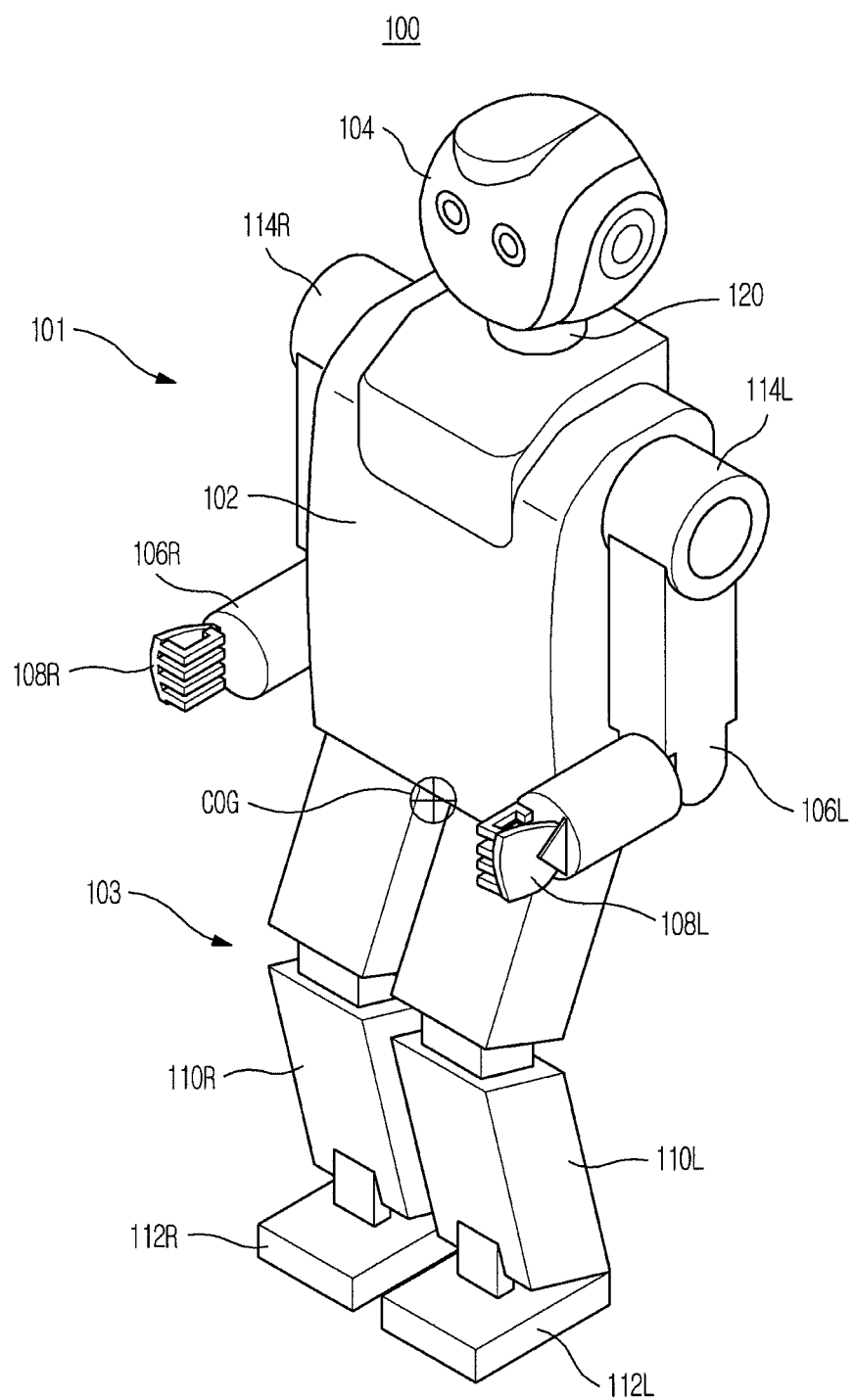
FIG. 1 is a view illustrating an external appearance of a robot in accordance with an embodiment.

Reference will now be made in detail to embodiments, examples of which are illustrated in the accompanying drawings, wherein like reference numerals refer to like elements throughout.

FIG. 1 is a view illustrating an external appearance of a robot in accordance with an embodiment.

As shown in FIG. 1, a robot 100 in accordance with an embodiment is a bipedal walking robot, which walks upright using two legs 110 in the same manner as a human, and includes an upper body 101 including a torso 102, a head 104, and arms 106, and a lower body 103 including the two legs 110.

The upper body 101 of the robot 100 includes the torso 102, the head 104 connected to the upper portion of the torso 102 through a neck 120, the two arms 106L and 106R connected to both sides of the upper portion of the torso 102 through shoulders 114L and 114R, and hands 108L and 108R respectively connected to tips of the two arms 106L and 106R.

The lower body 103 of the robot 100 includes the two legs 110L and 110R connected to both sides of the lower portion of the torso 102 of the upper body 101, and feet 112L and 112R respectively connected to tips of the two legs 110L and 110R.

Here, "R" and "L" respectively indicate the right and left sides of the robot 100, and COG indicates the center of gravity of the robot 100.

Figure 2:
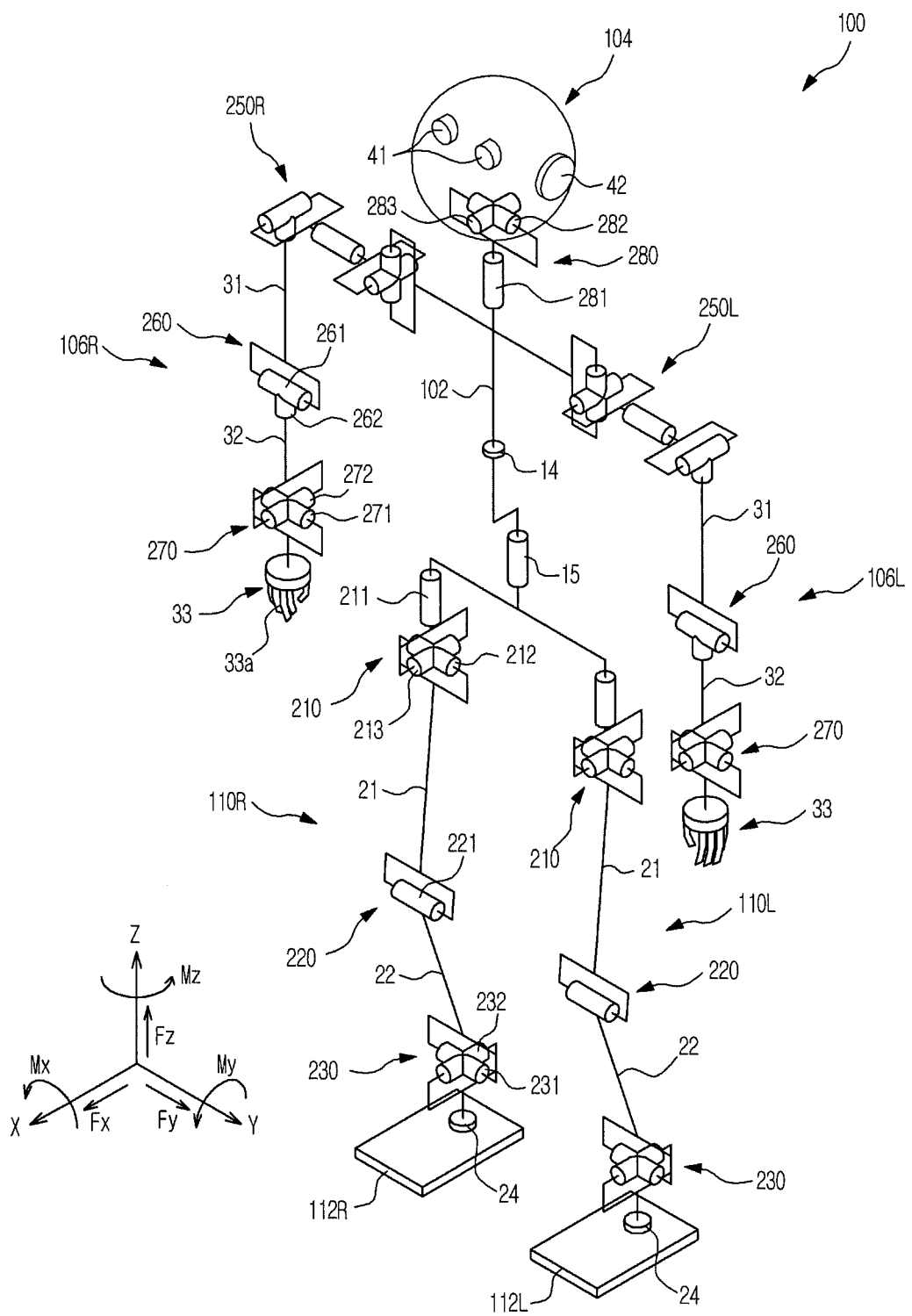
FIG. 2 is a view illustrating structures of main joints of the robot of FIG. 1.

FIG. 2 is a view illustrating structures of main joints of the robot of FIG. 1.

As shown in FIG. 2, a pose sensor 14 is installed on the torso 102 of the robot 100. The pose sensor 14 detects a tilt angle of the upper body 101, i.e., an inclination of the upper body 101 with respect to a vertical axis, and an angular velocity thereof, and then generates pose data. The pose sensor 14 may be installed on the two legs 110L and 110R as well as the torso 102.

A waist joint unit 15 having 1 degree of freedom in the yaw direction so as to rotate the torso 101 is installed on the torso 102, Further, cameras 41 to capture surrounding images and microphones 42 to input user's voice are installed on the head 104 of the robot 100.

The head 104 is connected to the torso 102 of the upper body 101 through a neck joint unit 280. The neck joint unit 280 includes a rotary joint 281 in the yaw direction (rotated around the Z-axis), a rotary joint 282 in the pitch direction (rotated around the Y-axis), and a rotary joint 283 in the roll direction (rotated around the X-axis), and thus has 3 degrees of freedom.

Motors (for example, actuators, such as electric motors or hydraulic motors) to rotate the head 104 are connected to the respective rotary joints 281, 282, and 283 of the neck joint unit 280.

The two arms 106L and 106R of the robot 100 respectively have upper arm links 31, lower arm links 32, and the hands 108L and 108R.

The upper arm links 31 are connected to the upper body 101 through shoulder joint units 250L and 250R, the upper arm links 31 and the lower arm links 32 are connected to each other through elbow joint units 260, and the lower arm links 32 and the hands 108L and 108R are connected to each other by wrist joint units 270.

The shoulder joint units 250L and 250R are installed at both sides of the torso 102 of the upper body 101, and connect the two arms 106L and 106R to the torso 102 of the upper body 101.

Each elbow joint unit 260 has a rotary joint 261 in the pitch direction and a rotary joint 262 in the yaw direction, and thus has 2 degrees of freedom.

Each wrist joint unit 270 has a rotary joint 271 in the pitch direction and a rotary joint 272 in the roll direction, and thus has 2 degrees of freedom.

Each hand 108L or 108R is provided with five fingers 33a. A plurality of joints (not shown) driven by motors may be installed on the respective fingers 33a. The fingers 33a perform various motions, such as grasping of an article or pointing in a specific direction, in connection with movement of the arms 106.

The two legs 110L and 110R respectively have thigh links 21, calf links 22, and the feet 112L and 112R.

The thigh links 21 correspond to thighs of a human and are connected to the torso 102 of the upper body 101 through hip joint units 210, the thigh links 21 and the calf links 22 are connected to each other by knee joint units 220, and the calf links 22 and the feet 112L and 112R are connected to each other by ankle joint units 230.

Each hip joint unit 210 has a rotary joint (hip yaw joint) 211 in the yaw direction (rotated around the Z-axis), a rotary joint (hip pitch joint) 212 in the pitch direction (rotated around the Y-axis), and a rotary joint (hip roll joint) 213 in the roll direction (rotated around the X-axis), and thus has 3 degrees of freedom.

Each knee joint unit 220 has a rotary joint 221 in the pitch direction, and thus has 1 degree of freedom.

Each ankle joint unit 230 has a rotary joint 231 in the pitch direction and a rotary joint 232 in the roll direction, and thus has 2 degrees of freedom.

Since six rotary joints of the hip joint unit 210, the knee joint unit 220, and the ankle joint unit 230 are provided on each of the two legs 110L and 110R, a total of twelve rotary joints is provided to the two legs 110L and 110R.

Although not shown in the drawings, actuators, such as motors to drive the respective rotary joints, are installed on the robot 100. A grasp control unit to control a grasping operation of the robot 100 properly controls these motors, thereby achieving various grasping motions of the robot 100.

Figure 3:
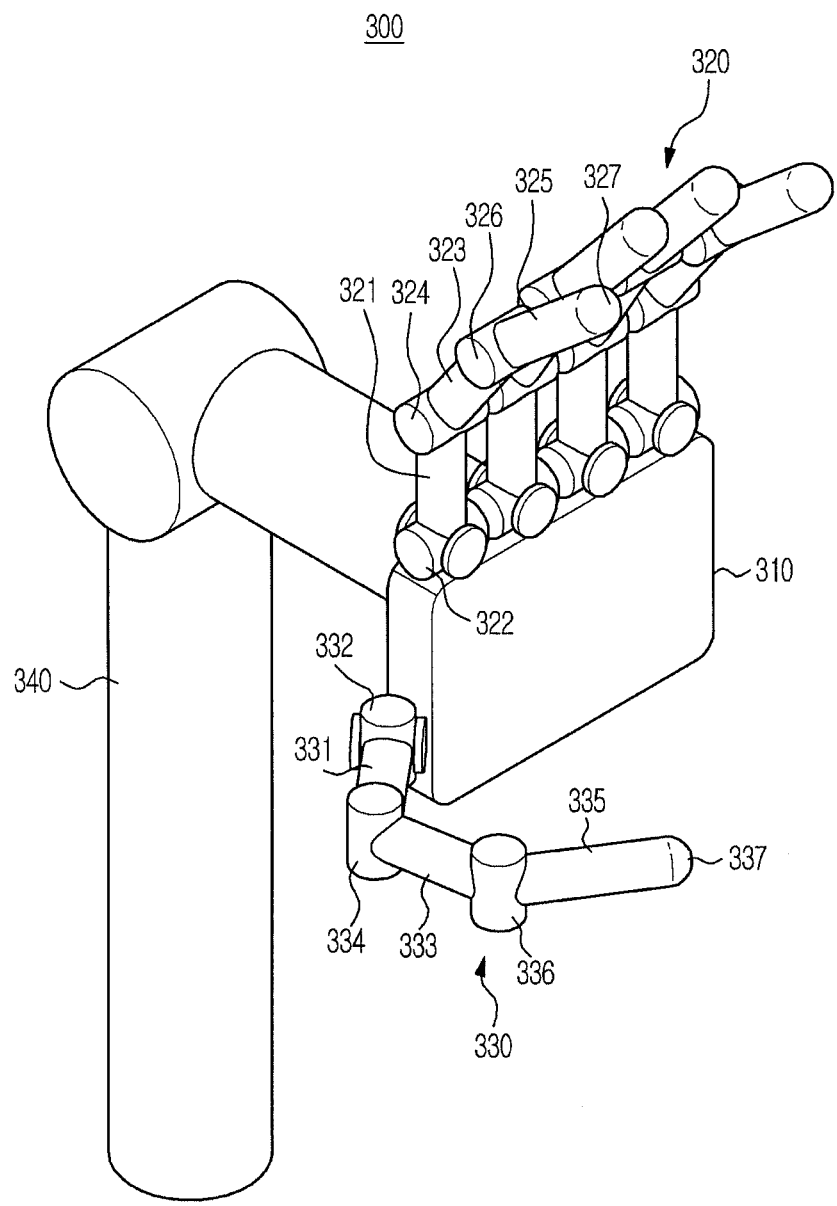
FIG. 3 is a perspective view illustrating a schematic configuration of a robot hand in accordance with an embodiment.

FIG. 3 is a perspective view illustrating a schematic configuration of a robot hand in accordance with an embodiment.

As shown in FIG. 3, a robot hand 300 in accordance with an embodiment includes a palm 310 and a plurality of fingers 320 and 330 connected to the palm 310. The palm 310 is connected to an arm 340 with at least 1 degree of freedom.

The plurality of fingers 320 and 330 includes a plurality of main grasp fingers (hereinafter, referred to as first fingers) 320 extended in the same direction at the edge of one end of the palm 310 and bent in the direction of the palm 310, and at least one sub-grasp finger (hereinafter, referred to as a second finger) 330 extended in a direction differing from the plurality of first fingers 320 and bent in the direction of the palm 310.

The plurality of first fingers 320 corresponds to a forefinger, a middle finger, a ring finger, and a little finger of a human hand, and the at least one second finger 330 corresponds to a thumb of the human hand. Each of the first fingers 320 and the second finger 330 includes a plurality of link members 321, 323, 325 or 331,333, 335 and a plurality of joints 322, 324, 326 or 332, 334, 336 connecting the plural link members 321, 323, 325 or 331,333, 335.

The plurality of link members 321, 323, 325 or 331,333, 335 includes a first link member 321 or 331, a second link member 323 or 333, and a third link member 325 or 335, which are sequentially arranged close to the palm 310, and the plurality of joints 322, 324, 326 or 332, 334, 336 includes a first joint 322 or 332, a second joint 324 or 334, and a third joint 326 or 336, which are sequentially arranged close to the palm 310. The first joint 322 or 332 connects the palm 310 and the first link member 321 or 331, the second joint 324 or 334 connects the first link member 321 or 331 and the second link member 323 or 333, and the third joint 326 or 336 connects the second link member 323 or 333 and the third link member 325 or 335. Tips 327 of the third link members 325 and 335 correspond to tips of the respective fingers 320 and 330. Further, an encoder (not shown) to measure an angle between the neighboring link members 321, 323, 325, or 331,333, 335 is installed at each of the plural joints 322, 324, 326, or 332, 334, 336.

Figure 4:
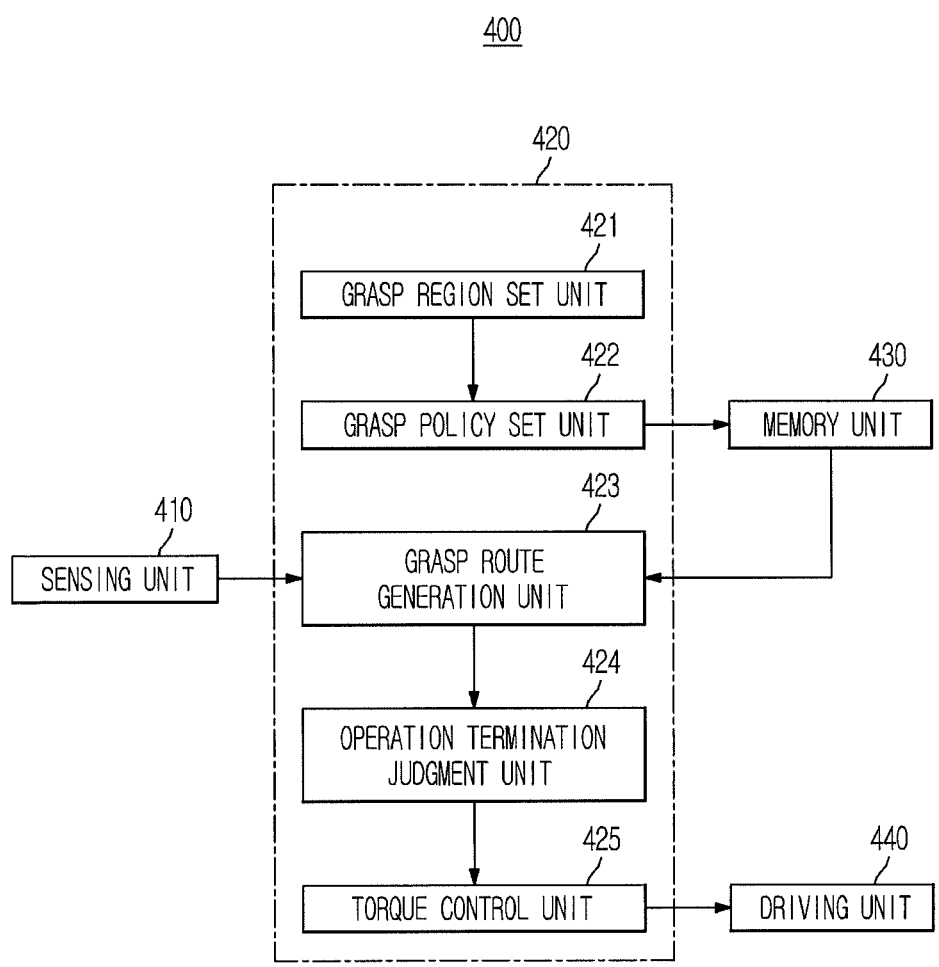
FIG. 4 is a grasp control block diagram of the robot in accordance with an embodiment.

FIG. 4 is a grasp control block diagram of the robot in accordance with an embodiment. The robot includes a sensing unit 410, a grasp region set unit 421, a grasp policy set unit 422, a grasp route generation unit 423, an operation termination judgment unit 424, a torque control unit 425, a memory unit 430, and driving units 440.

The sensing unit 410 includes pose sensors installed on the torso of the robot to detect inclinations or poses of both arms and a sensor to recognize an object, which is a target to be grasped. In this embodiment, the sensing unit 410 measures angles of the shoulder joint units, the elbow joint units, the ankle joint units, and the plural joints constituting the hands of the robot. Further, the sensing unit 410 recognizes the object to be grasped, and recognizes an orientation of the object, whether or not an obstacle is present around the object, and an orientation of the obstacle, and then transmits the recognized data to a grasp control unit 420.

The grasp region set unit 421 divisionally sets plural regions of the object using shape data of plural objects, which are stored in advance. In more detail, the grasp region set unit 421 divides the shape of each of the plural objects into a target grasp region where a grasping operation is finally performed, and remaining grasp regions excluding the target grasp region.

The grasp control unit 420 can include, or have operations performed by, a computer. For example, grasp region set unit 421, grasp policy set unit 422, grasp route generation unit 423, operation termination judgment unit 424 and/or torque control unit 425 can include, or have operations performed by, a computer. Moreover, sensing unit 410, memory unit 430 and/or driving unit 440 can include, or have operations performed by, a computer.

Figure 5:
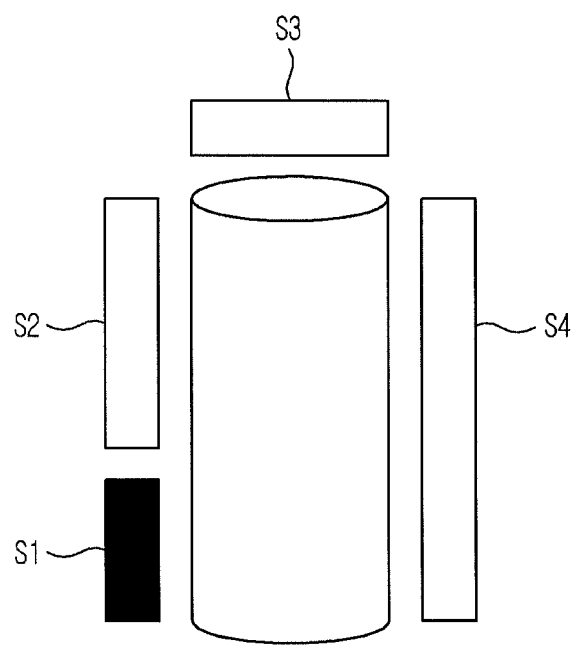
FIG. 5 is a view illustrating one example of an object, grasp regions of which are set.

FIG. 5 is a view illustrating one example of an object, grasp regions of which are set. As shown in FIG. 5, a target grasp region S1 is restricted to a designated region of the shape of the object, and a plurality of feasible grasp regions S2, S3, and S4 is randomly provided.

The grasp policy set unit 422 sets grasp policies including relative orientations of the robot hand and the object and data of the robot hand to grasp the object according to the grasp regions. That is, the grasp policy set unit 422 sets orientation data, such as which hand grasps the set grasp regions and the positions of the robot hand with respect to the grasp regions, according to the respective grasp regions. Further, the grasp policies include the relative orientations of the robot hand and the grasp regions and variation data, which is a range of moving the robot hand at the relative orientation in the directions of the x-axis, y-axis, and z-axis with respect to the object.

Figure 6:
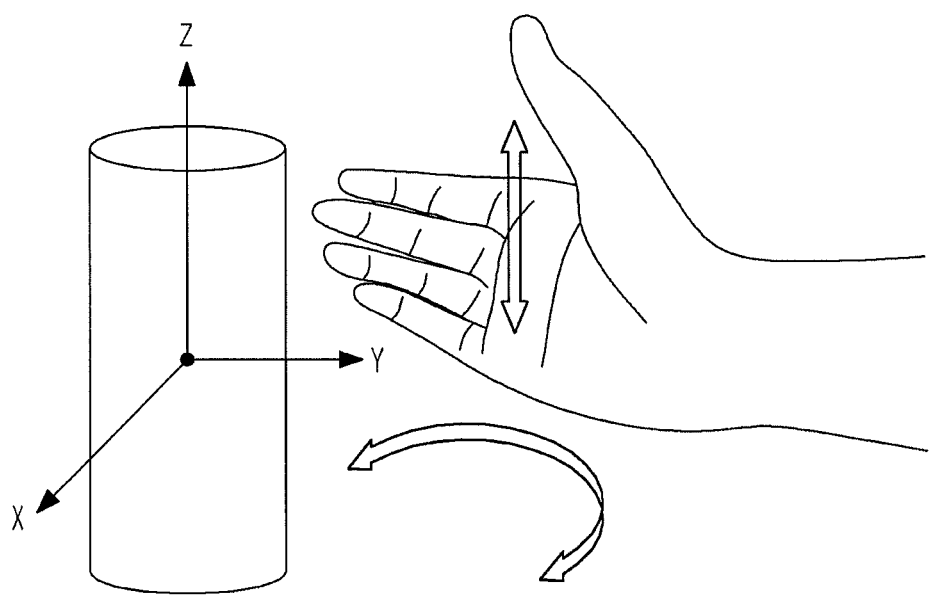
FIG. 6 is a view illustrating one example of a grasp policy stored in a memory unit of FIG. 4.

Now, a grasp policy for the feasible grasp region S4 among the feasible grasp regions S2, S3, and S4 of FIG. 5 will be exemplarily described with reference to FIG. 6. In order to grasp the feasible grasp region S4, the robot uses its right hand, and orientation data in which the right hand of the robot is located on the y-axis of the feasible grasp region S4 with respect to the object is set. Further, the grasp policy further includes variation data in which the right hand of the robot on the position on the y-axis moves in parallel in the direction of x-axis or the z-axis.

Grasp policy data corresponding to the grasp regions, generated in such a manner, are transmitted to the memory unit 430 and are stored in a grasp policy database.

The grasp route generation unit 423 generates a grasp route using the grasp policy database stored in the memory unit 430.

In more detail, the grasp route generation unit 423 judges whether or not the robot is capable of grasping the target grasp region using angles of the joint units constituting the robot arms sensed by the sensing unit 410, a current state including orientation data of the object and an obstacle and the grasp policy database stored in the memory unit 430.

As a result of the judgment, when it is judged that the robot is capable of grasping the target grasp region, the grasp route generation unit 423 generates a grasp route to the target grasp region using the grasp policy of the target grasp region, and when it is judged that the robot is incapable of grasping the object at the target grasp region, the grasp route generation unit 423 generates a grasp route of one feasible grasp region. That is, if the robot is incapable of grasping the target grasp region due to presence of an obstacle in the target grasp region, location of the target grasp region at a position exceeding movable angles of the joint units, or loss of balance by grasping of the target grasp region, the robot first performs grasping of a proper feasible grasp region.

When it is judged that the robot is incapable of grasping the target grasp region, if the plural feasible grasp regions are present, the grasp route generation unit 423 determines the order of priority of the plural feasible grasp regions such that the feasible grasp regions more proper to be grasped in consideration of the sensed orientations of the object, the joint units, and the obstacle are given priority. Further, the grasp route generation unit 423 sequentially generates the grasp routes of the feasible grasp regions from the grasp route to the feasible grasp region having a high priority.

Hereinafter, a process of generating grasp routes through the grasp route generation unit 423 will be described in detail.

First, when a grasp region of an object is set, the grasp route generation unit 423 receives the grasp policy corresponding to the grasp region from the memory unit 430, and solves the Inverse kinematic equation. That is, orientations of the object and the robot hand are converted into coordinates in the world coordinate system using the grasp policies, and rotation angles of the respective joint units are calculated based in the world coordinate system. Here, the joint units of the robots mean the shoulder joint units, the elbow joint units, the ankle joint units, and the plural joints constituting the hands of the robot.

When a solution to the Inverse kinematic equation is obtained, a proper grasp pose is calculated in consideration of constraints, such as movable angle ranges of the respective joint units, whether or not the robot hand collides with the obstacle, or self-collision between the robot hands.

Further, motion planning to generate grasp routes of the respective joint units is performed. That is, a quadratic curve (IK-Bi-RRT) is generated using the calculated grasp pose, and the quadratic curve serves as a movement route of each joint unit.

The operation termination judgment unit 424 judges which region the generated grasp route corresponds to, and judges whether or not the grasping operation is terminated according to a result of the judgment of the region which the generated grasp route corresponds to. A requirement to terminate the operation is set to generation of the grasp route to the target grasp region.

In more detail, when the grasp route to the feasible grasp region is generated, the operation termination judgment unit 424 judges this state as 'intermediate operation success', and when the grasp route to the target grasp region is generated, the operation termination judgment unit 424 judges this state as 'final operation success'. Further, when solutions to the Inverse kinematic equation with respect to all the regions of the object are not obtained and thus a grasp route is not generated, the operation termination judgment unit 424 judges this state as 'operation failure'.

That is, the operation termination judgment unit 424 repeats the above process until grasping of the target grasp region is performed. Thereby, stable regrasping of the object is performed without user intervention until grasping of the target grasp region is completed.

The memory unit 430 stores the database of the grasp policies set by the grasp policy set unit 422.

The grasp policy database is stored according to predetermined objects, and includes relative orientations of the robot hand and the object, the robot hand (right hand or left hand, i.e., any one of right and left hands) to grasp the object, and variation data.

Figure 7:
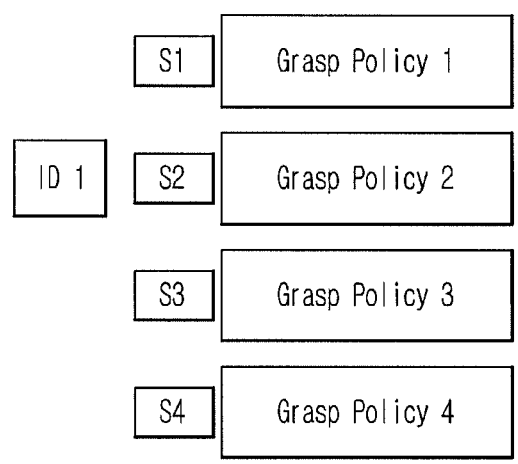
FIG. 7 is a view illustrating a grasp policy database stored in the memory unit of FIG. 4.

Hereinafter, one example of the grasp policy database will be described with reference to FIG. 7. FIG. 7 is a view illustrating the grasp policy database of the object shown in FIG. 5.

With reference to FIG. 7, the grasp policy database is stored according to predetermined objects ID. Further, the grasp policy database of a designated object ID1 stores grasp policies 1, 2, 3, and 4 of divided regions S1, S2, S3, and S4 of the object ID1.

The torque control unit 425 calculates and controls torques of the respective joint units so as to cause the respective joint units of the robot to trace the grasp routes generated by the grasp route generation unit 423.

The driving units 440 transmit the control torques calculated by the torque control unit 425 to the respective joint units, and output torque control signals corresponding to the control torques, calculated to drive the actuators, such as the motors installed on the joint units, to the joint units.

Figure 8:
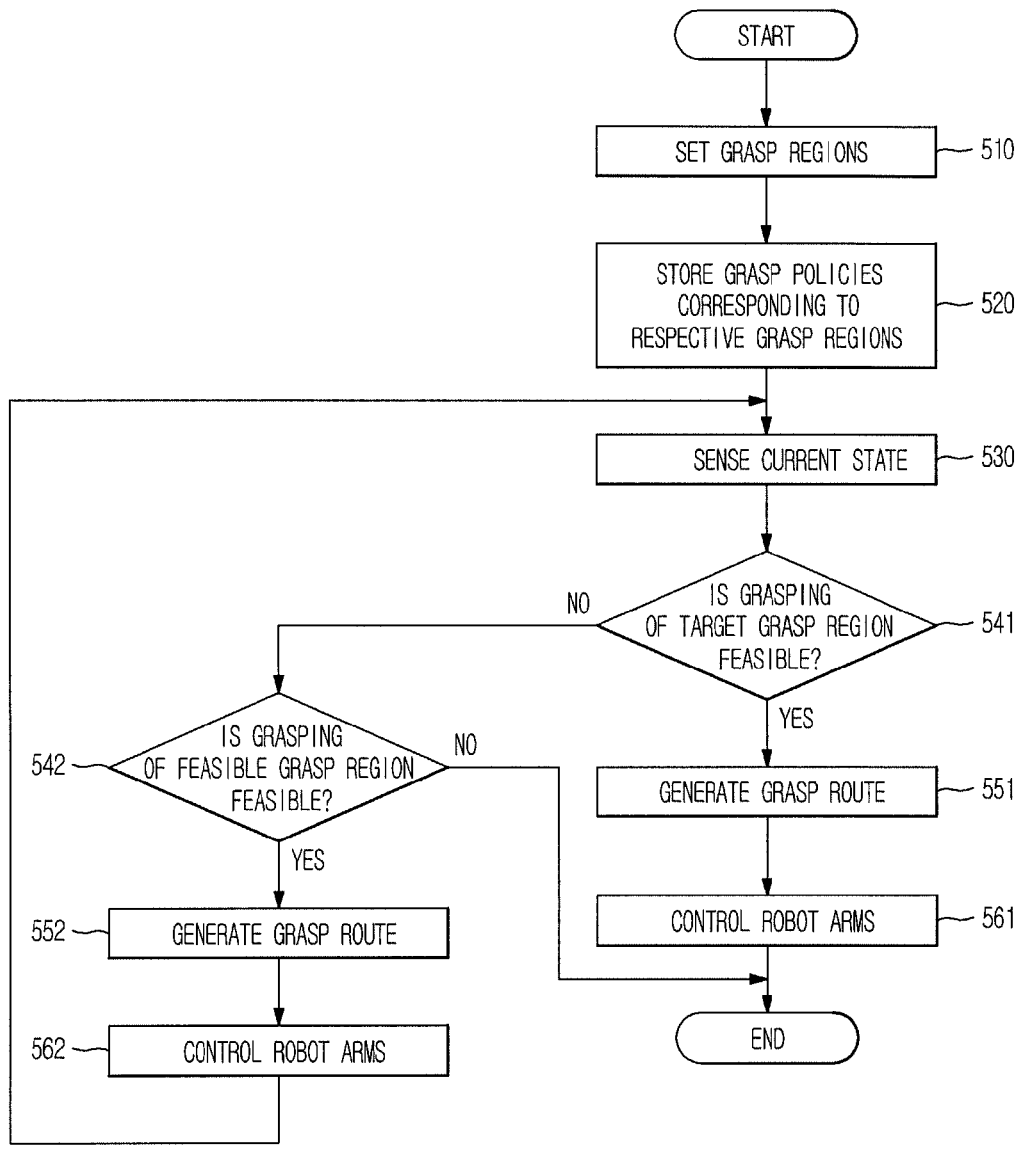
FIG. 8 is a flow chart illustrating a control method of a robot in accordance with an embodiment.

FIG. 8 is a flow chart illustrating a control method of a robot in accordance with an embodiment.

First, the grasp region set unit divisionally sets regions of an object (operation 510). That is, the object is divided into a target grasp region where a grasping operation of the object is required, and feasible grasp regions where the grasping operation of the object can be performed instead of the target grasp region. The target grasp region may be restricted to a designated region of the object, and the feasible grasp regions may be set to a plurality of regions.

When the regions of the object are set, grasp policies corresponding to the respective regions are set (operation 520), and are stored in the memory unit as the grasp policy database.

The grasp policies of the respective regions of the object are set, and include relative orientations of the robot hand and the object and variation data, i.e., parallel movable and rotatably movable ranges of the robot hand at such an orientation. The grasp policy further includes data of a robot hand (right hand or left hand, i.e., any one of right and left hands) to grasp the object, thereby achieving stable grasping with two hands.

That is, the grasp policy includes data regarding where the robot hand is located with respect to the object and which hand grasps the object.

When the grasp policy databases of objects are stored, the sensing unit senses a current state, i.e., orientations of an object to be grasped, the respective joint units, and an obstacle (operation 530). That is, the sensing unit senses the object, and thus detects a kind of the object, an orientation of the object, whether or not the obstacle is present around the object, and an orientation of the obstacle. Further, the sensing unit sense angles of the shoulder joint units, the elbow joint units, the ankle joint units, and the plural joints constituting the hands of the robot, and orientations of the respective joint units.

When the sensing unit senses the current state of the object and the respective joint units (operation 530), the grasp route generation unit judges whether or not grasping of the target grasp region of the object is feasible (operation 541).

The judgment as to whether or not grasping of the target grasp region is feasible is determined by whether or not an obstacle is present in the target grasp region and movable angle ranges of the respective joint units. That is, if an obstacle is present in the target grasp region or the target grasp region is located at a position exceeding the movable angle ranges of the respective joint units, it is judged that grasping of the target grasp region is not feasible.

As a result of the judgment, if grasping of the target grasp region is feasible, a grasp route to the target grasp region is generated (operation 551). On the other hand, if grasping of a feasible grasp region instead of the target grasp region is feasible (operation 542), a grasp route to the feasible grasp region is generated, and if grasping of any feasible grasp region is not feasible (operation 542), this state is judged as 'grasping operation failure' and the grasping operation is terminated.

That is, the grasp route generation unit judges whether or not grasping of the target grasp region of the object is feasible (operation 541), and, if it is judged that grasping of the target grasp region not feasible, generates a grasp route to perform grasping of the most proper one of the plural feasible grasp regions based on the current state sensed by the sensing unit (operations 542 and operation 552).

When the region of the obstacle to be grasped is determined, the grasp route generating unit receives the grasp policy of such a region from the memory unit, and thus performs grasp planning. Grasp planning means a process of calculating a plurality of grasp poses in the world coordinate system by finding a solution to the Inverse kinematic equation with respect to the grasp policy stored in the memory unit.

In more detail, the grasp policy stored in the memory unit converts relative orientations of the object and the robot hand in the object coordinate system into coordinates in the world coordinate system using the current state sensed by the sensing unit. Further, a solution to the Inverse kinematic equation is obtained using the orientations of the object and the robot hand converted into the coordinates in the world coordinate system, and rotation angles of the respective joints are calculated thereby.

That is, when the solution to the Inverse kinematic equation is calculated, a plurality of proper grasp poses is calculated in consideration of movable angle ranges of the respective joint units, whether or not the robot hand collides with the obstacle, or self-collision between the robot hands.

Thereafter, motion planning to generate grasp routes of the respective joint units using the plural grasp poses calculated through the above grasp planning is performed. The motion planning is a process of generating movement routes of the respective joint units to perform the calculated plural grasp poses, and is performed through the quadratic curve (IK-Bi-RRT).

When the grasp route to the grasp region of the object is generated (operation 551 or operation 552), the robot arm is controlled based on the grasp route (operation 561 or operation 562).

In more detail, the torque control unit calculates torques of the respective joint units so as to allow the joint units of the robot to trace the generated grasp routes. Further, the driving units supply the control torques calculated by the torque control unit to the joint units, and output torque control signals corresponding to the control torques, calculated to drive the actuators, such as the motors installed on the joint units, to the joint units.

When the robot arm is controlled based on the generated grasp route (operation 561 or operation 562), the operation termination judgment unit judges which region the generated grasp route corresponds to, and judges whether or not the grasping operation is terminated according to a result of the judgment of the region which the generated grasp route corresponds to.

In more detail, when the grasp route for one of the feasible grasp regions is generated, the operation termination judgment unit judges this state as 'intermediate operation success', and when the grasp route to the target grasp region is generated, the operation termination judgment unit judges this state as 'final operation success'. Further, when solutions to the Inverse kinematic equation with respect to both the feasible grasp regions and the target grasp region are not obtained and thus any grasp route is not generated, the operation termination judgment unit judges this state as 'operation failure' and terminates the grasping operation.

That is, when the generated grasp route is judged as the grasp route to the target grasp region, the grasping operation is terminated, and when the generated grasp route is judged as the grasp route to the feasible grasp region, the process of recognizing the current state of the object and the respective joint units until the grasp route to the target grasp region is generated, generating the grasp route to the target grasp region, and controlling the robot arm according to the grasp route is repeated.

Therefore, although an obstacle is present in the target grasp region, grasping of the feasible grasp regions is performed, thereby solving conventional problems, such as operation failure due to presence of the obstacle or setting of individual regions by a user one by one. That is, in this embodiment, the object is divided into the plural regions, grasping of the feasible grasp regions is performed although an obstacle is present in the target grasp region, and stable regrasping of the object and manipulation of both hands are achieved without user intervention until grasping of the target grasp region is completed.

Hereinafter, an object grasping process of the robot using the control method of FIG. 8 will be described with reference to FIGS. 9A to 9D.

The sensing unit of the robot senses a current state and shape of an object. The current state means orientations of the object and an obstacle and positions of the respective joint units. Further, the robot obtains a grasp policy database corresponding to the sensed object from the memory unit.

The right lower end (seen from the robot's perspective) of the object (a cylinder), as shown in FIGS. 9A to 9D, is set as the target grasp region of the object, and the grasp policy of the target grasp region is set to grasping of the right lower end of the object with the right hand of the robot.

Figure 9A:
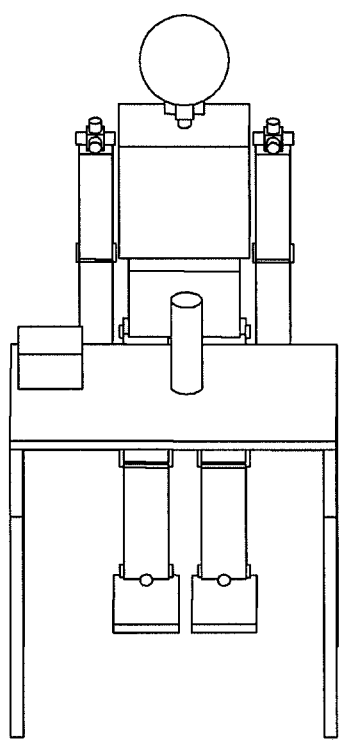
FIGS. 9A to 9D are views illustrating an object grasping operation of the robot using the control method of FIG. 8.

With reference to FIG. 9A, the grasp route generation unit judges that grasping of the target grasp region is not feasible due to presence of an obstacle (a hexahedron) in the target grasp region (the right lower end) of the object through the current state and shape data of the object (the cylinder) sensed by the sensing unit.

Figure 9B:
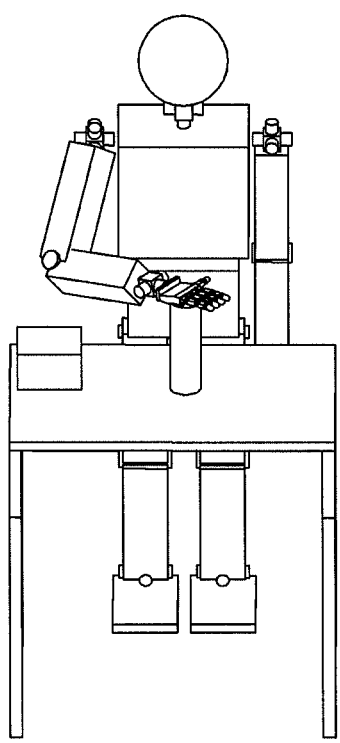
Figure 9C:
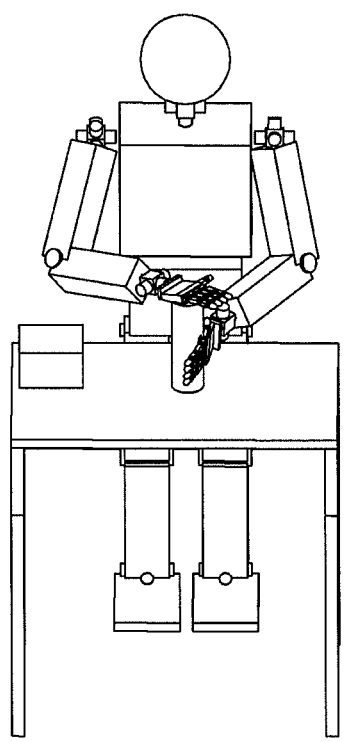

Therefore, as shown in FIG. 9B, the upper end of the object, which is one of plural feasible grasp regions, is selected, and a grasp route is generated using the grasp policy for the selected grasp region. Thereby, a grasping operation of lifting up the upper end of the object with the right hand of the robot is performed.

When the above grasping operation is performed, the operation termination judgment unit judges which region the generated grasp route corresponds to, and judges whether or not the grasping operation is terminated according to a result of the judgment of the region which the generated grasp route corresponds to. In FIG. 9B, the upper end of the object is not the target grasp region but is the feasible grasp region, the operation termination judgment unit judges this state as 'intermediate operation success'. Further, the operation termination judgment unit repeats the process of recognizing the current state and generating the grasp route.

In FIG. 9C, the sensing unit again recognizes the current state in which the right hand of the robot grasps the upper end of the object, and thereby the grasp route generation unit generates a proper grasp route.

The grasp route generation unit judges whether or not grasping of the target grasp region is feasible based on the current state in which the right hand of the robot grasps the upper end of the object. Since, in the current state in which the right hand of the robot grasps the upper end of the object, grasping of the target grasp region with the same hand is not feasible, a grasp route of grasping the left side of the object, which is another of the feasible grasp regions, with the left hand of the robot is generated. The operation termination judgment unit judges this state as 'intermediate operation success', and then repeats the process.

Figure 9D:
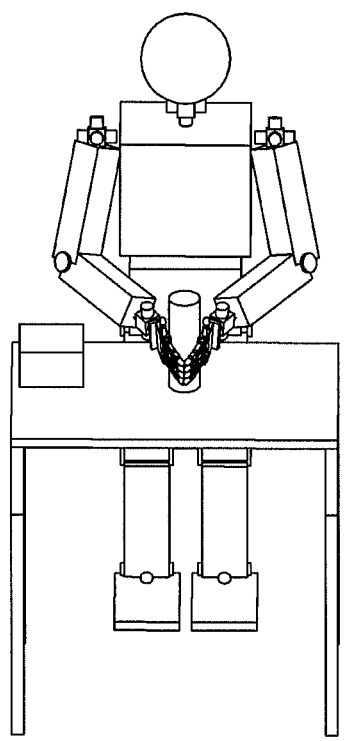

In FIG. 9D, the sensing unit recognizes the current state in which the left hand of the robot grasps the left side of the object, and judges whether or not grasping of the target grasp region with the right hand of the robot is feasible based on the recognized current state. Therefore, a grasp route of grasping the right lower end of the object, which is the target grasp region, with the right hand of the robot is generated. Then, the operation termination judgment unit judges this state as 'final operation success', and then terminates the grasping operation.

With reference to FIGS. 9A to 9D, when an obstacle is present in the target grasp region, grasping operations for other feasible grasp regions other than the target grasp region are performed, and stable regrasping is carried out until a grasping operation for the target grasp region is performed.

As is apparent from the above description, in a robot and a control method thereof in accordance with an embodiment, although an obstacle is present in a target grasp region of an object, grasping of feasible grasp regions other than the target grasp region is first performed and stable regrasping is carried out until grasping of the target grasp region is performed.

Further, grasp poses are calculated by grasp policies in consideration of manipulation of both hands and self-collision between both hands, and thus efficient manipulation of both hands is controlled.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A control method of a robot with a plurality of robot arms, each of which has at least one joint unit and a hand, the control method comprising:
    dividing an object into a target grasp region and feasible grasp regions and storing grasp policies respectively corresponding to the target grasp region and the feasible grasp regions, the target grasp region being a region of the object where a grasping operation is finally performed, the feasible grasp regions being remaining regions excluding the target grasp region from the object, and the grasp policies including data regarding where the hand is located with respect to the object and which hand grasps the object for each of the divided regions; and
    after said dividing,
        sensing respective orientations of the object, the at least one joint unit, and an obstacle,
        judging whether or not grasping of the target grasp region is feasible in consideration of the orientations of the obstacle and the object and a movable angle range of the at least one joint unit,
        generating a grasp route using the grasp policy for the target grasp region, upon judging that grasping of the target grasp region is feasible, and generating a grasp route using the grasp policy for one of the feasible grasp regions, upon judging that grasping of the target grasp region is not feasible, and
        controlling the at least one joint unit and the hand of each robot arm so as to trace the generated grasp route.

2. The control method according to claim 1, wherein the sensing, the judging, the generating, and the controlling are repeated until grasping of the target grasp region is performed.

3. The control method according to claim 1, wherein the grasp policies include data regarding a robot hand grasping the object and relative orientations of the robot hand grasping the object and the object.

4. The control method according to claim 1, wherein, in the judging, it is judged that grasping of the target grasp region is not feasible if the obstacle is located in the target grasp region, the target grasp region is located at a position exceeding the movable angle range of the at least one joint unit, or grasping of the target grasp region causes the robot to lose balance.

5. The control method according to claim 1, wherein at least one of the dividing, the sensing, the judging and the generating are performed by a computer.

6. A robot with right and left arms, each of which has at least one joint unit and a hand, comprising:
    a memory unit to divide an object into a target grasp region and feasible grasp regions and to store grasp policies respectively corresponding to the target grasp region and the feasible grasp regions, the target grasp region being a region of the object where a grasping operation is finally performed, the feasible grasp regions being remaining regions excluding the target grasp region from the object, and the grasp policies including data regarding where the hand is located with respect to the object and which hand grasps the object for each of the divided regions;
    a sensing unit to, after the object is divided into the target grasp region and the feasible grasp regions by the memory unit, sense respective orientations of the object, the at least one joint unit, and an obstacle; and
    a grasp control unit to judge whether or not grasping of the target grasp region is feasible in consideration of the orientations of the obstacle and the object and a movable angle range of the at least one joint unit, to generate a grasp route using the grasp policy for the target grasp region stored in the memory unit, upon judging that grasping of the target grasp region is feasible, and to generate a grasp route using the grasp policy for one of the feasible grasp regions stored in the memory unit, upon judging that grasping of the target grasp region is not feasible.

7. The robot according to claim 6, wherein
    the sensing unit repeats the sensing of the respective orientations of the object, the at least one joint unit, and the obstacle, and the grasp control unit repeats the judging as to whether or not grasping of the target grasp region is feasible, and the generating the grasp route, until grasping of the target grasp region is performed.

8. The robot according to claim 6, wherein the grasp control unit controls the at least one joint unit and the hand of each robot arm so as to trace the generated grasp route.

9. The robot according to claim 6, wherein the memory unit stores the grasp policies including data regarding a robot hand grasping the object and relative orientations of the robot hand grasping the object and the object.

10. The robot according to claim 6, wherein the grasp control unit judges that grasping of the target grasp region is not feasible if the obstacle is located in the target grasp region, the target grasp region is located at a position exceeding the movable angle range of the at least one joint unit, or grasping of the target grasp region causes the robot to lose balance.

11. A method comprising:
dividing an object to be grasped by a robot into a target grasp region and feasible grasp regions, the target grasp region being a region of the object where a grasping operation is finally performed, the feasible grasp regions being remaining regions excluding the target grasp region from the object; and after said dividing,
judging whether or not grasping of the object in the target grasp region by the robot is feasible in consideration of orientation of an obstacle,
upon judging by said judging that grasping of the object in the target grasp region is feasible,
generating a grasp route for the target grasp region, and
controlling the robot to trace the generated grasp route and to thereby grasp the object in the target grasp region, and
upon judging by said judging that grasping of the object in the target grasp region is not feasible,
generating a grasp route for one of the feasible grasp regions,
controlling the robot to trace the generated grasp route and to thereby grasp the object in said one of the feasible grasp regions.

12. A method according to claim 11, wherein said dividing and said judging are performed by a computer.

* * * * *